United States Patent
Tomfohrde et al.

(10) Patent No.: US 9,256,717 B2
(45) Date of Patent: Feb. 9, 2016

(54) MANAGED MOBILE MEDIA PLATFORM SYSTEMS AND METHODS

(75) Inventors: Peter W. Tomfohrde, West Windsor, NJ (US); John R. Williams, New York, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/411,386

(22) Filed: Mar. 2, 2012

(65) Prior Publication Data
US 2013/0232553 A1 Sep. 5, 2013

(51) Int. Cl.
| | |
|---|---|
| *G06F 15/16* | (2006.01) |
| *G06F 21/00* | (2013.01) |
| *G06F 21/10* | (2013.01) |
| *H04W 12/08* | (2009.01) |
| *H04L 29/08* | (2006.01) |

(52) U.S. Cl.
CPC .............. *G06F 21/10* (2013.01); *H04L 67/306* (2013.01); *H04W 12/08* (2013.01)

(58) Field of Classification Search
CPC ................ G06F 21/10; G06F 21/6218; G06F 2221/2101; G06F 2221/2141; H04L 63/102; H04L 67/306
See application file for complete search history.

(56) References Cited

U.S. PATENT DOCUMENTS

| | | | |
|---|---|---|---|
| 5,678,041 A * | 10/1997 | Baker et al. | |
| 5,887,250 A * | 3/1999 | Shah | 455/411 |
| 6,061,346 A * | 5/2000 | Nordman | 370/352 |
| 6,381,579 B1 * | 4/2002 | Gervais et al. | 705/7.13 |
| 6,640,097 B2 * | 10/2003 | Corrigan et al. | 455/414.1 |
| 6,721,886 B1 * | 4/2004 | Uskela | 713/168 |
| 7,088,995 B2 * | 8/2006 | Rao | 455/418 |
| 7,337,436 B2 * | 2/2008 | Chu | G06F 8/20 717/140 |
| 7,676,573 B2 * | 3/2010 | Herzog et al. | 709/224 |
| 7,684,321 B2 * | 3/2010 | Muirhead et al. | 370/230 |
| 7,698,113 B2 * | 4/2010 | Steinbach et al. | 703/2 |
| 7,764,700 B2 * | 7/2010 | Muirhead et al. | 370/401 |
| 7,899,748 B2 * | 3/2011 | Peters | 705/40 |
| 8,126,772 B1 * | 2/2012 | LeFebvre | 705/14.34 |
| 8,572,707 B2 * | 10/2013 | Tuchman et al. | 726/7 |

(Continued)

FOREIGN PATENT DOCUMENTS

WO      WO 0117169 A2 *  3/2001

OTHER PUBLICATIONS

Hargil, "Application Explosion: What's the Right Business Model?", 2010, IEEE, 7 pages.*

(Continued)

*Primary Examiner* — Andrew Nalven
*Assistant Examiner* — Walter Malinowski

(57) ABSTRACT

An exemplary system includes 1) a mobile computing device provided by a vertical solution provider for use by a customer of an industry service provider to access one or more services provided by the industry service provider and 2) a mobile media platform provider subsystem operated by the vertical solution provider and configured to communicate with the mobile computing device. The mobile media platform provider subsystem and the mobile computing device are configured to provide a mobile media platform managed by the vertical solution provider and configured to facilitate the use of the mobile computing device by the customer to access the one or more services provided by the industry service provider.

21 Claims, 5 Drawing Sheets

(56) References Cited

U.S. PATENT DOCUMENTS

| | | | |
|---|---|---|---|
| 2002/0069278 A1* | 6/2002 | Forslow | 709/225 |
| 2002/0093537 A1* | 7/2002 | Bocioned et al. | 345/777 |
| 2002/0162005 A1* | 10/2002 | Ueda et al. | 713/182 |
| 2003/0139174 A1* | 7/2003 | Rao | 455/418 |
| 2003/0172138 A1* | 9/2003 | McCormack et al. | 709/220 |
| 2003/0212709 A1* | 11/2003 | De Schrijver | 707/104.1 |
| 2004/0157593 A1* | 8/2004 | Lee | G06F 8/36 455/418 |
| 2004/0215711 A1* | 10/2004 | Martin et al. | 709/203 |
| 2005/0198247 A1* | 9/2005 | Perry et al. | 709/223 |
| 2005/0213567 A1* | 9/2005 | Mullins et al. | 370/352 |
| 2005/0226468 A1* | 10/2005 | Deshpande et al. | 382/115 |
| 2005/0227678 A1* | 10/2005 | Agrawal et al. | 455/414.3 |
| 2006/0009213 A1* | 1/2006 | Sturniolo et al. | 455/426.1 |
| 2006/0026268 A1* | 2/2006 | Sanda | 709/221 |
| 2006/0094462 A1* | 5/2006 | Nguyen et al. | 455/556.1 |
| 2006/0227953 A1* | 10/2006 | Hwang | 379/201.02 |
| 2006/0253894 A1* | 11/2006 | Bookman | H04L 63/0428 726/2 |
| 2007/0016684 A1* | 1/2007 | Stieglitz et al. | 709/229 |
| 2007/0129057 A1* | 6/2007 | Xu et al. | 455/410 |
| 2007/0254631 A1* | 11/2007 | Spooner | 455/411 |
| 2008/0005021 A1* | 1/2008 | Brown et al. | 705/40 |
| 2008/0041942 A1* | 2/2008 | Aissa | 235/382 |
| 2008/0083000 A1* | 4/2008 | Orrell et al. | 725/53 |
| 2008/0086370 A1* | 4/2008 | Narayanaswami | G06F 2/1415 705/14.73 |
| 2008/0098062 A1* | 4/2008 | Balia | 709/203 |
| 2008/0177667 A1* | 7/2008 | Weinberg | 705/64 |
| 2008/0195664 A1* | 8/2008 | Maharajh et al. | 707/104.1 |
| 2008/0201386 A1* | 8/2008 | Maharajh et al. | 707/201 |
| 2008/0208739 A1* | 8/2008 | Phillips | 705/40 |
| 2008/0235746 A1* | 9/2008 | Peters et al. | 725/111 |
| 2008/0255947 A1* | 10/2008 | Friedman | 705/14 |
| 2008/0300887 A1* | 12/2008 | Chen et al. | 705/1 |
| 2009/0017866 A1* | 1/2009 | White et al. | 715/716 |
| 2009/0049174 A1* | 2/2009 | Rudnik | 709/226 |
| 2009/0157792 A1* | 6/2009 | Fiatal | 709/201 |
| 2009/0238349 A1* | 9/2009 | Pezzutti | 379/93.02 |
| 2009/0262921 A1* | 10/2009 | Poghul et al. | 379/229 |
| 2009/0320122 A1* | 12/2009 | Cheng et al. | 726/15 |
| 2009/0327232 A1* | 12/2009 | Carter et al. | 707/3 |
| 2010/0036724 A1* | 2/2010 | Headings et al. | 705/14.35 |
| 2010/0037138 A1* | 2/2010 | Shcherbakov et al. | 715/716 |
| 2010/0043066 A1* | 2/2010 | Miliefsky | 726/9 |
| 2010/0100939 A1* | 4/2010 | Mahaffey et al. | 726/4 |
| 2010/0146014 A1* | 6/2010 | Ionescu et al. | 707/810 |
| 2010/0262506 A1* | 10/2010 | Zargahi et al. | 705/26 |
| 2011/0016533 A1* | 1/2011 | Zeigler et al. | 726/26 |
| 2011/0153806 A1* | 6/2011 | Bagasra | 709/224 |
| 2011/0161721 A1* | 6/2011 | Fulginiti | G06Q 10/10 714/2 |
| 2011/0182425 A1* | 7/2011 | Burnett et al. | 380/200 |
| 2011/0200052 A1* | 8/2011 | Mungo et al. | 370/401 |
| 2011/0225417 A1* | 9/2011 | Maharajh et al. | 713/150 |
| 2011/0246308 A1* | 10/2011 | Segall | G06Q 10/109 705/14.66 |
| 2011/0264545 A1* | 10/2011 | Schenberg Frascino | 705/26.1 |
| 2011/0276604 A1* | 11/2011 | Hom et al. | 707/802 |
| 2012/0036494 A1* | 2/2012 | Gurumohan et al. | 717/106 |
| 2012/0058744 A1* | 3/2012 | Felt et al. | 455/414.1 |
| 2012/0129503 A1* | 5/2012 | Lindeman et al. | 455/414.1 |
| 2012/0131685 A1* | 5/2012 | Broch et al. | 726/30 |
| 2012/0143730 A1* | 6/2012 | Ansari et al. | 705/27.1 |
| 2012/0151509 A1* | 6/2012 | McCarthy et al. | 725/9 |
| 2012/0166279 A1* | 6/2012 | Collins | 705/14.53 |
| 2012/0184287 A1* | 7/2012 | Jovicic et al. | 455/456.1 |
| 2012/0216133 A1* | 8/2012 | Barker et al. | 715/760 |
| 2012/0218075 A1* | 8/2012 | Hill | G07C 9/00103 340/5.61 |
| 2012/0246731 A1* | 9/2012 | Blaisdell et al. | 726/26 |
| 2012/0255028 A1* | 10/2012 | Williams | G06F 21/602 726/26 |
| 2012/0315972 A1* | 12/2012 | Olson et al. | 463/17 |
| 2012/0324067 A1* | 12/2012 | Hari et al. | 709/222 |
| 2013/0084835 A1* | 4/2013 | Scherzer | H04W 48/14 455/414.1 |
| 2013/0086210 A1* | 4/2013 | Yiu et al. | 709/217 |
| 2013/0091557 A1* | 4/2013 | Gurrapu | 726/5 |
| 2013/0159520 A1* | 6/2013 | Engelhart | 709/225 |
| 2013/0218621 A1* | 8/2013 | Jackson et al. | 705/7.15 |
| 2014/0041016 A1* | 2/2014 | Chanda et al. | 726/17 |

OTHER PUBLICATIONS

Valente, "The evolution of web-based optimization: From ASP to e-Services", Decision Support Systems 43, 2007, pp. 1096-1116.*

"What is vertical solutions provider (VSP)?", Definition from WhatIs.com, Sep. 2005, one page.*

Howard Forums, Nov. 2010, 6 pages, http://www.howardforums.com/showthread.php/1682470-VX8300-Can-I-modify-or-replace-the-built-in-Verizon-browser.*

Ajit, "Opengardens, walled gardens and mobile web 2.0", Jun. 23, 2006, 4 pages, http://www.opengardensblog.futuretext.com/archives/2006/06/opengardens_wal.html.*

Jones, George, Verizon Wireless's "Blank Slate" tablet enterprise initiative revealed, TabTimes, 5 pages, http://tabtimes.com/news/it-tech-solutions/2012/01/11/verizon-wireless-blank-slate-tablet-enterprise-initiative-revealed, as accessed on Jan. 30, 2012.

Verizon Wireless, Verizon Private Applications Store for Business, 2 pages, http://business.verizonwireless.com/content/b2b/en/wireless-products-services/private-applications-store.html, as accessed on Jan. 30, 2012.

Verizon, Verizon Introduces New Mobile Services Enablement Platform to Help Businesses Develop, Mobilize, Manage Applications Across a Global Enterprise, 2 pages, http://newscenter.verizon.com/press-releases/verizon/2010/verizon-introduces-new-mobile.html, as accessed on Feb. 21, 2012.

* cited by examiner

MANAGED MOBILE MEDIA PLATFORM SYSTEMS AND METHODS

BACKGROUND INFORMATION

As computing technologies have advanced, mobile computing devices such as tablet computers, smartphones, media player devices, and gaming devices have become commonplace in modern society. A user of a mobile computing device is typically able to use the device to access digital content by way of a media platform associated with the device.

Conventional mobile media platforms are typically suitable for common everyday uses of mobile computing devices but not for other specific applications of mobile computing devices. For example, consumer-grade mobile media platforms may lack sufficient security for certain applications. To illustrate, although certain providers of valuable information (e.g., business proprietary and/or critical information) may want to provide select people with mobile access to the information, the providers may choose not to allow the information to be distributed or accessed by way of conventional mobile media platforms. Such decisions may be based, at least in part, on a lack of control over conventional mobile media platforms, insufficient security of conventional mobile media platforms, and/or the level of technological and/or capital commitment that would be required of the providers in order to provide mobile access to the information in a sufficiently controlled and/or secure manner.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary managed mobile media platform systems and methods and implementations thereof are disclosed herein. The exemplary systems and methods described herein may provide a managed mobile media platform, which in certain embodiments may be dedicated for use to provide a vertical solution in a vertical market. To illustrate, in certain examples, the managed mobile media platform may be provided to and may allow an industry service provider in a specific vertical market (e.g., a financial service provider in a financial services vertical market) to leverage the platform to deliver a unique, rich media experience and/or content (e.g., content applications) to select customers of the industry service provider in a secure and convenient manner that is free of the limitations of secure browser access models, third-party-controlled media platforms, and/or consumer mobile application stores associated with conventional mobile media platforms, such as horizontal market mobile media platforms controlled by third parties. The industry service provider may do this with little or no technological or capital commitment at least because the managed mobile media platform is fully configured and managed by a vertical solution provider and provided by the vertical solution provider to the industry service provider as a vertical solution and/or infrastructure for a vertical solution in a vertical market.

In certain examples, the mobile media platform may be fully managed end-to-end by a single provider (e.g., a vertical solution provider) across build, deployment, and operation of the platform, which end-to-end management by the single provider may provide security, reliability, cost-effectiveness, scalability, and/or convenience that is unmatched by conventional mobile media platforms. For example, the managed mobile media platform may provide a level of security that secures valuable content and/or services made available by way of the platform to a degree that is acceptable to one or more industry service providers, which may facilitate the industry service providers making valuable content and/or services (e.g., business critical and/or proprietary information and/or services) available for mobile access by way of the managed mobile media platform. In certain implementations, the providers of the content and/or services may leverage the managed mobile media platform to make the content and/or services accessible by way of the managed mobile media platform with little or no increased technology management commitment.

Examples of managed mobile media platform systems and methods and implementations thereof will now be described in reference to the accompanying drawings.

Figure 1:
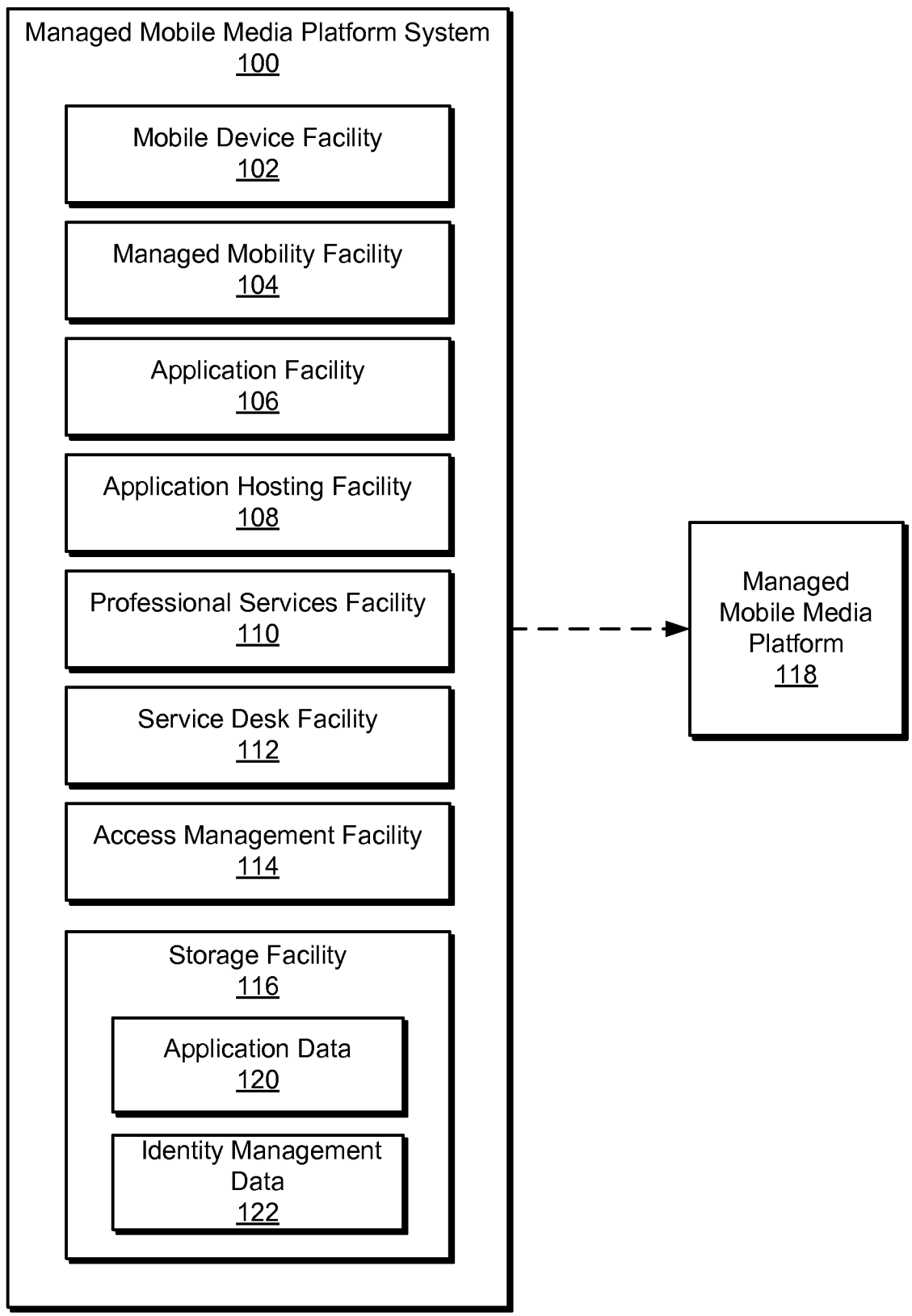
FIG. 1 illustrates an exemplary managed mobile media platform system that provides a managed mobile media platform according to principles described herein.

FIG. 1 illustrates an exemplary managed mobile media platform system 100 ("platform system 100"). As shown, platform system 100 may include, without limitation, a mobile device facility 102, a managed mobility facility 104, an application facility 106, an application hosting facility 108, a professional services facility 110, a service desk facility 112, an access management facility 114, and a storage facility 116, which may be in communication with one another using any suitable communication technologies. It will be recognized that although facilities 102-116 are shown to be separate facilities in FIG. 1, any of facilities 102-116 may be combined into fewer facilities, such as into a single facility, or divided into more facilities as may serve a particular implementation.

Platform system 100 may be configured to provide a managed mobile media platform 118 ("platform 118"), which may provide an infrastructure for delivery of content for experiencing by a user of a mobile computing device, such as an end user of a service (e.g., an industry-specific service provided by an industry service provider). The content may include any form of digital content that may be accessed and processed by a mobile computing device. For example, the content may include media content (e.g., video, audio, images, etc.), documents, communications (e.g., audio calls, video calls, messaging, chats, interactive communications, etc.), content applications (e.g., industry-specific software applications), and/or any other content that may be accessed and processed by a mobile computing device by way of platform 118.

In certain implementations, platform system 100 and/or platform 118 may be managed (e.g., operated) by a single service provider who provides platform 118 as a vertical solution in a vertical market. The provider of the vertical solution and/or platform 118, who may be referred to herein as a "vertical solution provider" and/or a "media platform provider," may utilize system 100 to provide platform 118, as a vertical solution and/or infrastructure for a vertical solution, to an "industry service provider" who provides an industry service to one or more customers in a vertical market. In certain implementations, the media platform provider may comprise a telecommunications service provider who is postured to provide components of platform 118. In certain implementations, the industry service provider may comprise a financial service provider who provides one or more financial services to one or more customers in a financial service market. Examples of such implementations are described herein.

Facilities 102-116 may be configured to perform one or more operations that contribute to platform 118 and/or to platform system 100 providing platform 118. Each of facilities 102-116 will now be described.

Data generated and/or used by platform system 100 may be stored in storage facility 116. For example, storage facility 116 may store application data 120 generated and/or used by one or more applications (e.g., software applications) included in application facility 106 and/or hosted by application hosting facility 108. Storage facility 116 may also store identity management data 122 generated and/or used by access management facility 114. Additional and/or alternative data may be stored by storage facility 116 in other embodiments.

Mobile device facility 102 may include and/or be configured to provide a mobile computing device for use by a user to obtain mobile access content and/or services by way of platform 118. The mobile computing device may include a tablet computer, a smart phone, a mobile phone, or any other suitable mobile computing device configured to perform one or more of the mobile computing device operations described herein.

Mobile device facility 102 may perform one or more operations to secure the mobile computing device. For example, mobile device facility 102 may include and/or install computer-readable code on the mobile computing device to provide one or more security features, such as features that control applications running on the device, control remote access to data, and/or add specific security features to applications running on the device (e.g., add application data encryption/decryption features, copying and/or pasting operation restrictions, etc.). In this or a similar manner, mobile device facility 102 may lock down code, applications, and/or features of the mobile computing device in order to secure the device at a level that is acceptable to a media platform provider and/or an industry service provider. In certain implementations, mobile device facility 102 may include and/or use computer-readable code provided by vendors such as 3LM and/or Mocana to secure the device.

By securing the mobile computing device, mobile device facility 102 is able to provide a level of security configured to protect the mobile computing device from potential breaches in security from unmanaged, uncontrolled, and/or unknown sources. For instance, the mobile computing device may be blocked from accessing content from any source that is not managed by or otherwise under the control of the media platform provider and/or the industry service provider.

Managed mobility facility 104 may be configured to provide a mobility management service through which the media platform provider is able to remotely manage and/or operate the mobile computing device included in and/or provided by mobile device facility 102. The mobility management service may provide one or more device administration and/or management tools. Through the mobility management service, for example, the media platform provider may remotely run code and/or features of the mobile computing device, including code and/or features that have been locked down by mobile device facility 102. Additionally or alternatively, the mobility management service may enforce passwords, control device resets, wipe the device remotely, deploy applications, connect to back-office systems, and/or control the security of the mobile computing device. In certain embodiments, the mobility management service may provide the media platform provider with device administration services, web-based device administration and reporting portals, and/or administrative helpdesk services. Through such administrative tools, the provider may order, deploy, and fully manage the mobile computing device remotely (e.g., globally). In certain implementations, managed mobility facility 104 may provide a mobile managed service that comprises one or more Verizon Managed Mobility Services provided by Verizon Communications, Inc. (e.g., Mobile Services Enablement Platform ("MSEP"), Mobile Device Management, Mobile Security, Inventory and Expense Management, and Logistics services provided by Verizon Communications, Inc.).

Application facility 106 may include and/or provide one or more applications (e.g., firmware and/or software applications) configured to be accessed and/or run by the mobile computing device. The applications may be provided and/or controlled by the media platform provider and may include native device applications and/or web applications configured to run on and/or be accessed by the mobile computing device. The media platform provider may act as a central administrator who strictly controls and manages the applications.

In certain implementations, the applications included in and/or provided by application facility 106 may be developed, published, distributed, and managed using an application mobility platform, such as the Antenna Mobility Platform provided by Antenna Software, the Sybase Unwired Platform provided by SAP, MSEP provided by Verizon Communications, Inc., or another application mobility platform, which may be included in the mobility management service provided by managed mobility facility 104. The application mobility platform may support business-to-business, business-to-enterprise, and business-to-customer applications, including employee and/or customer facing applications. The application mobility platform may further support secure distribution of web applications provided by the media platform provider on the mobile computing device, customer portals, mobile commercial and/or private application stores, and optimal viewing of websites on the mobile computing device.

In certain exemplary implementations, application facility 106 may include and/or provide applications that provide content and/or tools related to an industry service in a vertical market. As an example, the applications may include a brokerage application that is intended to be utilized by key principals of financial service customers, such as principals of a hedge fund that is a customer of a brokerage. The brokerage application may be configured to provide a mobile version of the brokerage's desktop application, display real-time customer portfolio information (e.g., portfolio analytics, dashboards, position details, ranks, trades, etc.), engage communication services (e.g., to contact a hedge fund principal about making transactions, to establish an interactive communication between a customer and a representative of the financial service provider, etc.), provide access to reports (e.g., filter and/research reports), provide access to the brokerage's research, analytics, and reports, and/or provide a user of the mobile computing device with one or more additional and/or alternative tools for interacting with the brokerage and/or content or services provided by the brokerage.

As another example, the applications may include a wealth management application intended to be utilized by select high net worth customers of a financial service provider. The wealth management application may provide a streamlined, mobile version of an existing web application, provide access to portfolio information (e.g., account balances, activities, etc.), execute trades and provide access to information helpful for making trade decisions, provide alerts and/or notifications based on subscriptions, keywords, and/or filters, provide access to videos and/or news feeds provided by the financial service provider, track funds and provide fund reports, provide access to personalized watch lists, provide access to market research and information, and/or provide a user of the mobile computing device with one or more additional and/or alternative tools for interacting with the financial service provider and/or content or services provided by the financial service provider.

Application facility 106 may include and/or provide one or more communication and/or collaboration applications configured to support unified communication and/or collaboration between a user of the mobile computing device and a representative of an industry service provider (e.g., an account manager representing a financial service provider). Through such applications, for example, platform 118 may provide high-value customers of a financial services provider with convenient (e.g., full-time connected access) and/or effective access to representatives of the financial services provider. Examples of such communication and/or collaboration applications may include applications that provide presence-based communications, video, web-based meetings, instant messaging, and/or other media or forms of communications. The applications may be configured to secure and/or archive such communications in accordance with governmental regulations and/or policies of the industry service provider. The applications may allow representatives of the industry service provider to share calendars, schedules, media, and/or other content with a user of the mobile computing device. Such convenient and/or effective communications may help to improve the interpersonal, information-intensive relationships between the industry service provider and its customers, which may help drive revenue and customer stickiness.

Application hosting facility 108 may be configured to securely host one or more applications for mobile access by one or more mobile computing devices. Application hosting facility 108 may host any of the applications included in and/or provided by application facility 106, applications provided by the media platform provider, and/or one or more applications provided by an industry service provider (e.g., one or more financial service applications provided by a financial service provider). Application hosting facility 108 may be configured to host one or more applications in any suitable way.

As an example, in certain implementations, application hosting facility 108 may be configured to leverage one or more of the services provided by managed mobility facility 104 to host the applications. To illustrate, managed mobility facility 104 may leverage the MSEP provided managed mobility facility 104, as mentioned above, to host one or more applications.

As another example, in certain implementations, application hosting facility 108 may be configured to host one or more applications by way of a private storefront operated by the media platform provider. For instance, in certain implementations, application hosting facility 108 may host one or more applications at a storefront known as the Verizon Private Application Store for Business provided by Verizon communications, Inc.

As another example, application hosting facility 108 may be configured to host one or more applications by way of a cloud service provided by the media platform provider. For instance, application hosting facility 108 may host the applications in an enterprise cloud service such as that provided by Terramark Worldwide, Inc., a cloud service provider controlled by the media platform provider.

In each of the above examples, application hosting facility 108 may host one or more applications at one or more data centers that are managed by or otherwise under the control of the media platform provider. This may help the media platform provider provide a media platform that is secure and/or robust as a vertical solution. For example, a mobile computing device may be locked down as described above such that the mobile computing device is able to access applications only from data centers controlled by the media platform provider. Such restricted access may provide a level of security that is greater than the security provided by a horizontal media platform that allows a mobile device to access content, such as a hosted content application, from a source that is not controlled by a vertical solution provider.

Professional services facility 110 may provide one or more tools configured for use by a representative of an industry service provider to access professional services provided by the media platform provider to configure, customize, and/or manage media platform 118. The tools may allow the industry service provider to work together with the media platform provider to plan, design, implement, and operate mobile platform 118 to define a custom vertical solution for the industry service provider. Examples of professional services that may be provided by the media service provider in this regard may include planning mobility strategy, providing business and use case workshops, developing policy and governance plans, designing a mobility secure architecture, applying the mobility secure architecture to design a vertical solution, identifying and creating applications that leverage mobile platform 118, implementing components of the vertical solution, building connectors and interfaces into an existing enterprise infrastructure for enterprise integration, creating and deploying mobile applications for hosting as described above, and managing device, security, application, mobility, and/or the vertical solution to provide a complete lifecycle approach to providing the vertical solution to the industry service provider.

Service desk facility 112 may be configured to provide one or more service desk tools for access by customers of an industry service provider who are users of mobile computing devices providing platform 118. Through the tools, a user of a mobile computing device may access a technical support service provided by the provider of platform 118. In this or a similar manner, service desk facility 112 may provide an IT service desk for access by the user of the mobile computing device such that the user may work directly with the media platform provider to address technical support issues associated with platform 118. Accordingly, the industry service provider may not be required to provide IT support for platform 118. The service desk service provided by service desk facility 112 may be dedicated to a specific industry service provider and may be provided as a layer of platform 118 to eliminate and/or minimize the IT commitment of the industry service provider with regard to platform 118. The media platform provider may provide the service desk service or may enlist another provider to provide, under the control of the media platform provider, the service desk service for access by the user of the mobile computing device.

Access management facility 114 may be configured to manage security of platform 118 such as by ensuring that only users who have been authorized by the media platform provider to access content by way of platform 118 are actually granted access to the content. To this end, access management facility 114 may be configured to register, credential, manage identities, and selectively authenticate authorized users to platform system 100.

To illustrate, access management facility 114 may provide one or more tools for use by a user and/or an industry service provider to request registration of the user with access management facility 114. In certain implementations, for example, access management facility 114 may provide a web portal through which the user and/or the industry service provider may create an identity for the user for registration with access management facility 114. Through the web portal, access management facility 114 may collect information about the user from the user and/or the industry service provider. Access management facility 114 may also obtain approval from the industry service provider indicating that the user is authorized by the industry service provider to access content provided by the industry service provider for mobile access by way of platform 118.

Access management facility 114 may be configured to provide identity proofing to validate that a user seeking registration is actually the person that the user claims to be. The identity proofing may be performed in any suitable way, including, for example, by using employer information, officially recognized identification, antecedent data, biometric data, and/or any other suitable information.

Based on the collected information and/or industry service provider approval, access management facility 114 may register the user with access management facility 114. The registration may include establishing an identity for the user within access management facility 114, which may include generating a user identity profile that represents the identity of the user. The profile may include data representative of any information about the user such as, but not limited to, a user identifier, one or more device identifiers for one or more devices associated with the user (e.g., a device identifier indicating a particular mobile computing device that the user is authorized to use to access content by way of platform 118, a device identifier for another device associated with the user, etc.), information about the user obtained from one or more affiliates of the media platform provider (e.g., cellular service data shared by a cellular service provider, which may be the media platform provider or an affiliate of the media platform provider), and/or any other information about the user and/or devices associated with the user.

In certain examples, the information in an identity profile may extend beyond information obtained in relation to platform system 100. For example, the identity profile of the user may be used in relation to other services and may include information obtained in relation to those services (e.g., a mobile phone service, an Internet access service, etc.). As another example, access management facility 114 may be configured to determine relationships between the identity profile of the user maintained by access management facility 114 and one or more other user profiles used for other services provided by the media platform provider (e.g., a mobile phone subscription service, an Internet access service, etc.) and to obtain information from those profiles for inclusion in the identity profile maintained by access management facility 114 and/or to otherwise manage the identity of the user. In this or a similar manner, access management facility 114 may leverage information from a number of services provided by the media platform provider, which may include information associated with a mobile phone network, a global IP network, an Internet backbone network, an Internet access network, forensic services associated with one or more of these networks, and/or user accounts for network services, for example.

Access management facility 114 may be configured to provision credentials for the user. This may be performed as part of the registration process or separate from the registration process and may include generating specific, unique credentials for the user, which credentials are to be provided by the user in order to obtain mobile access to content by way of platform 118. Any suitable credentials may be used, including tokens (e.g., hardware and/or software tokens), keys, user names, passwords (e.g., one-time passwords send to mobile computing devices), etc.

In certain examples, credentialing may include binding a user identity to a particular device and/or service. The device and/or service may then be used as a second factor when authenticating the user. For example, access management facility 114 may be configured to determine whether a device from which an access request is received is bound to the user identity associated with user credentials received along with the request. In this or a similar manner, access management facility 114 may employ multi-factor authentication processes based on user identity (e.g., user identity credentials), device identity, and/or service identity.

After registration and credentialing of the user, access management facility 114 may be configured to selectively authenticate the user before granting the user access to content by way of platform 118. Authentication may be selectively granted or denied based on one or more factors defined by the media service provider and/or the industry service provider, which factors may include, without limitation, credentials received from the user, verification of an identity of the user, verification of a mobile computing device associated with the user based on one or more attributes of the device (e.g., a MAC address, IP address, digital certificate, token, etc.), verification of a relationship between the user identity and the device identity, verification of a geographic location of the user and/or one or more mobile computing devices associated with the user, network data (e.g., an IP address) for the mobile computing device, interactive voice response analysis, and/or any other predefined authentication factors.

To illustrate an authentication example, access management facility 114 may detect an access request received from a mobile computing device along with user credentials (e.g., user login information). Access management facility 114 may compare information associated with the request and/or the credentials with a user profile that represents a user identity. If information associated with the request is determined, based on the comparison, to satisfy the predefined authentication factors, access management facility 114 may grant the requested access. If, on the other hand, the information associated with the request is determined, based on the comparison, not to satisfy one or more of the predefined authentication factors, access management facility 114 may deny access or perform one or more additional operations to further vet the user requesting access. Examples of such additional operations may include requesting additional information from the user and/or the mobile computing device, notifying and/or requesting additional information from the industry service provider, and/or any other operations that may help access management facility 114 accurately determine the identity of the user requesting access.

In certain examples, access management facility 114 may be configured to provide risk-based transactional scoring for detected access requests based on a predefined risk scoring heuristic. For example, based on one or more predefined factors, access management facility 114 may determine a risk score for a particular access request and determine one or more operations to perform based on the risk score.

Access management facility 114 may be configured to authenticate a user on a per-transaction basis, a network access basis, a federated basis, and/or any other basis associated with a particular level and/or type of mobile access. Such authentication may be designed to ensure that only an authorized user is permitted to access content, network, and/or service resources.

Access management facility 114 may be configured to generate and maintain, over time, an access log associated with a user identity profile. For example, access management facility 114 may be configured to detect certain predetermined events and/or information representative of such events that are associated with the user identity represented by the profile. For example, for each instance in which the user requests access to content by way of platform 118, access management facility 114 may identify and log information associated with the access request, such as by identifying and storing data representative of an IP address from which access is requested, a Wi-Fi network from which the access request is sent, a MAC address of a mobile computing device requesting access, a geographic location from which access is requested, a time at which access is requested, information about one or more other devices associated with the user such as a geographic location of another mobile device (e.g., a mobile phone) of the user, and/or any other information. The access log may represent digital breadcrumbs representative of the user's behavior.

Access management facility 114 may be configured to utilize the access log to selectively authenticate a user based at least in part on information included in the access log. To illustrate, the access log may indicate that historically the user's mobile phone is geographically usually proximate to the mobile computing device when the mobile computing device requests access to content. Based on this information, access management facility 114 may be configured to more readily authenticate a user when the user's mobile phone is located geographically proximate to the mobile computing device that the user is using to request access to content by way of platform 118. On the other hand, if the user's mobile phone is not within a geographic proximity of the mobile computing device, access management facility 114 may be configured to perform additional operations before authenticating the user.

To illustrate another example, access management facility 114 may utilize the access log to determine that based on a previous access event, that a current access request is suspicious for one or more reasons. For example, for the previous access event, an access log may indicate that a mobile computing device that requested access was located at a particular geographic location at a particular time when access was requested and/or granted. When the current access request is received, access management facility 114 may compare information associated with the current access request to data included in the access log and may determine that at the time of the current access request the mobile computing device is located at a geographic location that is incompatible with the data representative of the previous access event (e.g., the previous access was from New York City at 2:00 pm ET and the current access request is received from San Francisco at 3:00 pm ET on the same day). Based on such a determination, access management facility 114 may perform one or more additional operations before granting or denying authentication of the user for the current access request.

The access log may be used by access management facility 114 to detect anomalies in the behavior of a user. For example, the user may typically follow a daily routine and/or schedule, and access management facility 114 may be configured to use the access log to detect a deviation from the daily routine and/or schedule.

Access management facility 114 may additionally or alternatively be configured to utilize network forensic data to determine whether to authenticate a user. For example, the media platform provider may be involved in global network forensics and may profile IP addresses based on detected activities associated with the IP addresses. For instance, the media platform provider may provide a network forensic service that blacklists ranges of IP addresses based on detected malicious and/or suspicious activities associated with the IP addresses. Access management facility 114 may be configured to leverage such forensic information to determine whether to authenticate a user.

In certain implementations, one or more operations of access management facility 114 may be provided as a service, such as a universal identity service provided as a cloud-based solution that provides an identity ecosystem. For example, access management facility 114 may provide a universal identity service that comprises the Verizon Universal Identity Service ("UIS") provided by Verizon Communications, Inc.

In certain examples, the universal identity service provider may be the same entity as the media platform provider and may be postured to provide high-assurance security services by integrating one or more operations of access management facility 114 with one or more other services provided by the media platform provider. For example, the media platform provider may manage identities of users across multiple services and/or communications networks and may share information (e.g., access log information) across the services and/or networks, which sharing may allow the media platform provider to utilize a significant amount of relevant information to provide high-assurance security within a vertical solution provided to an industry service provider. In certain examples, this may be accomplished with little or no commitment by the industry service provider to manage or authenticate user identities.

In any of the ways described above, and/or in additional or alternative ways, access management facility 114 may manage an identity of a customer who uses a mobile computing device to obtain mobile access to content and/or services provided by an industry service provider for access by way of platform 118. The managed identity may be used by access management facility 114 to selectively authenticate the customer as being authorized to access the content and/or services. The identity management may include registering the customer with platform system 100 (e.g., such as by creating a user identity profile for the customer), provisioning credentials for the customer, and maintaining an access log that includes information related to one or more access events associated with the customer, as described herein.

In certain implementations, each of the facilities 102-116 of platform system 100 may be configured to provide one or more operations, tools, features, and/or services as a specific layer of platform 118. Platform system 100 may be configured to provide any combination of such layers within platform 118. In certain examples, the media platform provider may be configured to provide a combination of the layers as a service and to deliver the services at defined per-layer, per-user, and/or per-device price points.

Thus, platform 118 may include any combination of operations, tools, features, and/or services provided by one or more of facilities 102-116 layered together to form platform 118. For example, platform 118 may include a secure device layer that secures a mobile computing device, a managed mobility layer that allows for remote management of the secure mobile computing device, an application layer that provides one or more applications for execution by the secure mobile computing device, an application hosting layer that may receive one or more content applications from an industry service provider and/or a vertical solution provider and host the applications for mobile access by an authorized user of the secure mobile computing device, a professional services layer that provides tools for use to customize platform 118, a service desk layer that provider a user of the secure mobile computing device with technical support for platform 118, an access management layer that controls access to content and/or services made available by way of platform 118, and/or any combination or sub-combination of these layers.

Facilities 102-116 of platform system 100 may be implemented in any suitable way, including by and/or as one or more physical computing devices configured to perform the operations of facilities 102-116 described herein. In certain examples, platform system 100 and/or one or more facilities 102-116 of platform system 100 may be dedicated for and implemented in a vertical market.

Figure 2:
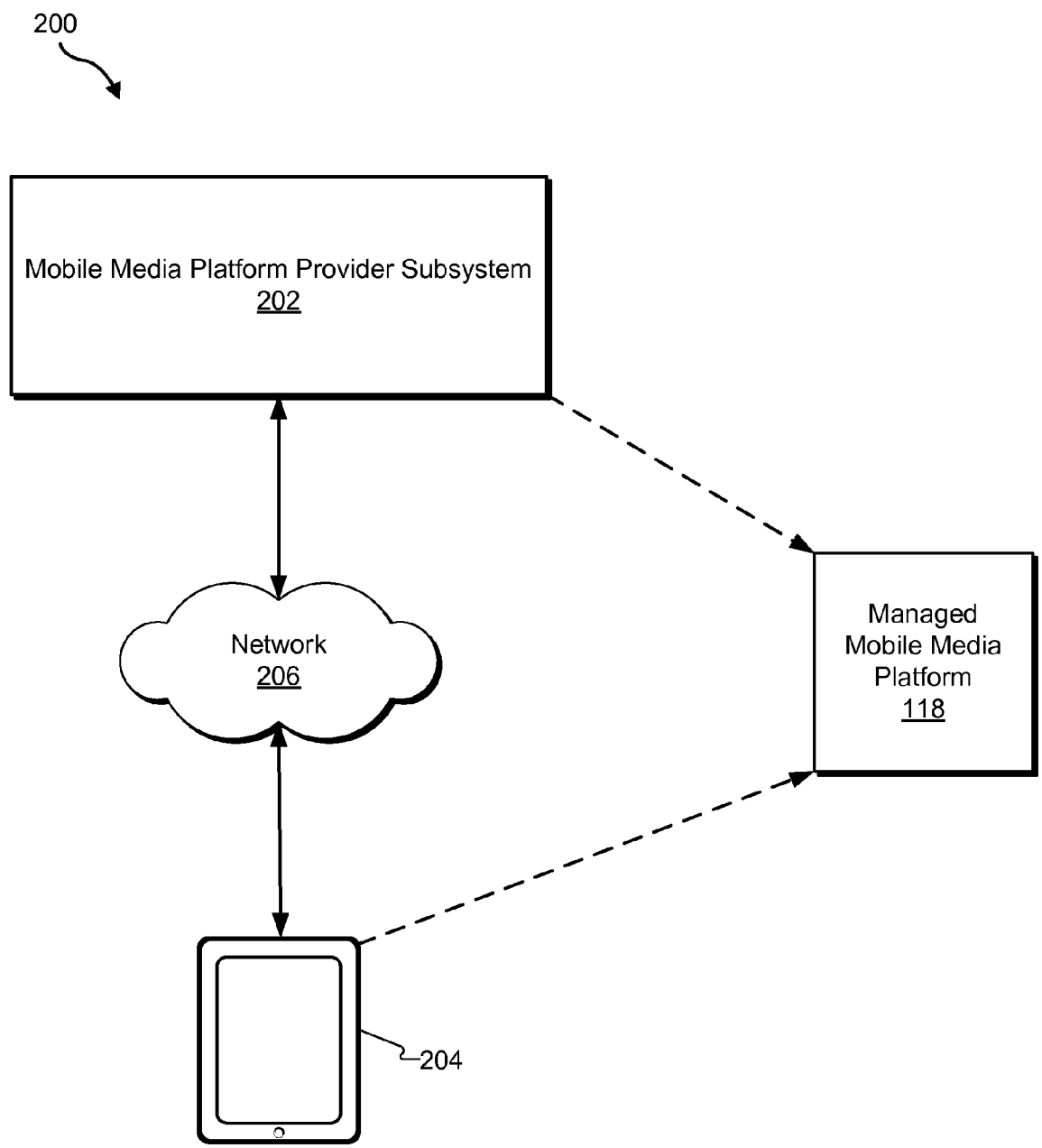
FIG. 2 illustrates an exemplary implementation of the system of FIG. 1 according to principles described herein.

FIG. 2 illustrates an exemplary implementation 200 of platform system 100. As shown, implementation 200 may include a mobile media platform provider subsystem 202 ("provider subsystem 202") and a mobile computing device 204 ("access device 204") in communication with one another by way of a network 206.

Provider subsystem 202 and access device 204 may communicate using any suitable remote communications technologies, including any communications technologies capable of supporting transport of data between provider subsystem 202 and access device 204. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, Wi-Fi, wireless communications technologies, other suitable communications technologies, and/or any combination or sub-combination thereof.

Through these and/or any other suitable data communication technologies, provider subsystem 202 and access device 204 may exchange communications and/or data by way of network 206. Network 206 may include any network or combination of networks provided by one or more appropriately configured network devices (and communication links thereto) and over which communications and data may be transported between provider subsystem 202 and access device 204. For example, network 206 may include, but is not limited to, a mobile phone network (e.g., a cellular phone network, a 3G network, a 4G network, etc.), a telecommunications network, the Internet, a wide area network, a local area network, a wireless network, any other network capable of transporting communications and data between provider subsystem 202 and access device 204, and/or any combination or sub-combination thereof.

Provider subsystem 202 may include or be implemented by one or more server-side computing devices controlled by (e.g., operated by) a service provider (e.g., by the vertical solution provider and/or media platform provider described herein). Access device 204 may include a mobile computing device that may be utilized by a user, who may be an end user of one or more services provided by provider subsystem 202, by the service provider operating provider subsystem 202, and/or by an industry service provider who leverages one or more services provided by provider subsystem 202 to provide industry-specific services to the end user. Access device 204 may be configured and deployed, by the service provider operating provider subsystem 202, for use by the user to access the one or more services and/or content associated with the services.

FIG. 2 illustrates access device 204 to include an exemplary mobile computing device in the form of a tablet computer. This is illustrative only. In other implementations, access device 204 may include any other suitable mobile computing device (e.g., a smartphone, a laptop computer, a mobile phone, etc.) configured as described herein.

As illustrated in FIG. 2, provider subsystem 202 and access device 204 may be configured to provide platform 118, which may be configured in any of the ways described herein. In certain examples, the service provider operating provider subsystem 202 may configure provider subsystem 202 and access device 204 to provide mobile media platform 118 as a vertical solution for use by an industry service provider to provide a service within a vertical market.

Figure 3:
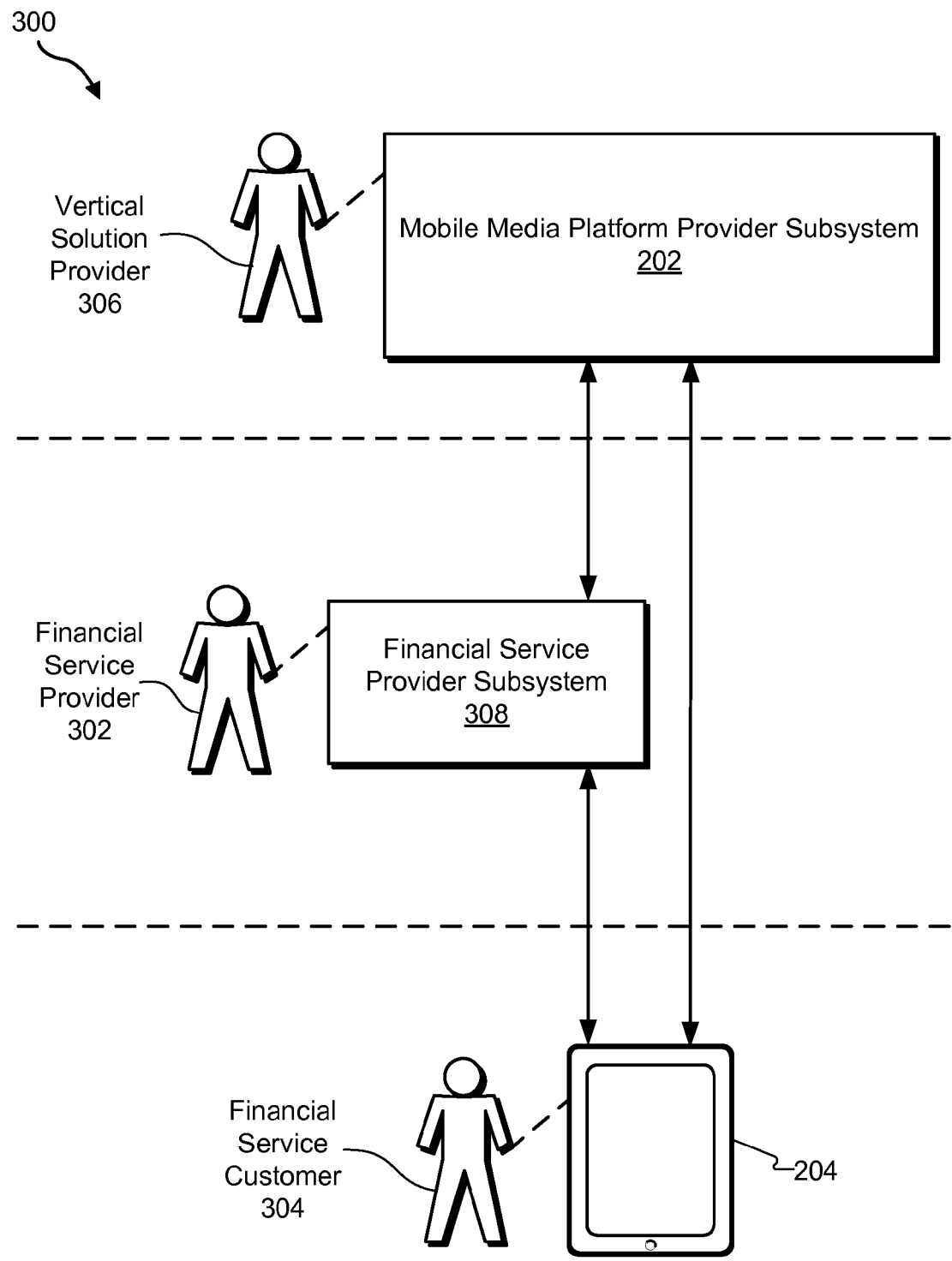
FIG. 3 illustrates an exemplary vertical market service system that implements the system of FIG. 1 according to principles described herein.

To illustrate, FIG. 3 shows an exemplary vertical market service system 300 ("vertical system 300") that may implement platform system 100 and may be configured to provide one or more industry services and/or content in a vertical market by way of platform 118. In the example illustrated in FIG. 3, the vertical market comprises a financial services market in which a financial service provider 302 may provide one or more financial services and/or content to a customer 304 of financial service provider 302. A vertical solution provider 306 may provide one or more vertical solutions to financial service provider 302 to provide the customer 304 with mobile access to the financial services and/or content provided by the financial service provider 302.

In certain implementations, the vertical solution provider 306 may be the same entity as the service provider who operates provider subsystem 202 and/or provides platform 118. As shown in FIG. 3, vertical solution provider 306 may operate provider subsystem 202. Vertical solution provider 306 may configure and deploy access device 204 for use by customer 304 to access one or more services provided by financial service provider 302. As shown in FIG. 3, customer 304 may operate access device 204. Financial service provider 302 may operate a financial service provider subsystem 308 (e.g., a server subsystem) to provide one or more financial services to customer 304.

Access device 204 may be configured to function as a centerpiece of an interactive relationship between financial service provider 302 and customer 304. In certain implementations, for example, financial service provider 302 may comprise a brokerage and/or bank that provides one or more brokerage and/or banking services to a high-value customer 304 (e.g., a customer who is a principal of an investment fund such as a hedge fund, a customer who pays financial service provider 302 service fees above a predefined fee threshold, etc.).

Financial service provider 302 may want to provide customer 304 with secure mobile access to content provided by financial service provider 302 as part of a service that financial service provider 302 provides to customer 304. To this end, financial service provider 302 may communicate with customer 304 and/or vertical solution provider 306 to arrange for customer 304 to be registered with provider subsystem 202 as a user of a vertical solution provided by vertical solution provider 306 and be given access device 204 for utilization by customer 304 to access content provided by financial service provider 302 (e.g., content made available by financial service provider subsystem 308 for access by access device 204 and/or content provided by financial service provider subsystem 308 to provider subsystem 202 which makes the content available for access by access device 204). Vertical solution provider 306 may configure access device 204 as described herein such that access device 204 is configured to access content provided by financial service provider 302 by way of platform 118.

Vertical solution provider 306 and/or provider subsystem 202 may obtain information about customer 304, validate the identity of customer 304, validate that customer 304 has been approved by financial service provider 302 to access content by way of platform 118, and register customer 304 with provider subsystem 202. The data collection and registration may be performed in any of the ways described herein, such as by customer 304 providing information by way of a web portal and financial service provider 302 indicating approval of the user for registration by way of the web portal or some other communication with vertical solution provider 306. Once the user is registered, provider subsystem 202 may manage the identity of the customer 304 in any of the ways described herein and use the managed identity of customer 304 to selectively authenticate customer 304 to provider subsystem 202 and/or financial service provider subsystem 308. Accordingly, customer 304 may utilize access device 204 to access content and/or services provided by financial service provider 302 in a secure and/or convenient manner.

Financial service provider 302 may create content that may be provided to customer 304 by way of platform 118. For example, financial service provider 302 may create one or more content applications and upload data representing the content applications to provider subsystem 202 for hosting by provider subsystem 202 for remote access by access device 204 by way of platform 118. Provider subsystem 202 (e.g., application hosting facility 108 implemented by provider subsystem 202) may receive and host the content applications for remote access by access device 204 by way of platform 118. Financial service provider 302 may create other content, such as financial service information and/or interactive communications, and provide such content directly from financial service provider subsystem 308 to access device 204 by way of media platform 118 or to provider subsystem 202 for access by access device 204 by way of platform 118. Thus, customer 304 may utilize access device 204 to securely access content provided by financial service provider 302 as part of a financial service.

Vertical solution provider 306 may fully manage the end-to-end configuration, deployment, and operation of access device 204. This may allow vertical solution provider 306 to provide financial service provider 302 with a secure vertical solution unmatched by other solutions that rely on conventional media platforms to provide access to content and/or services.

Figure 4:
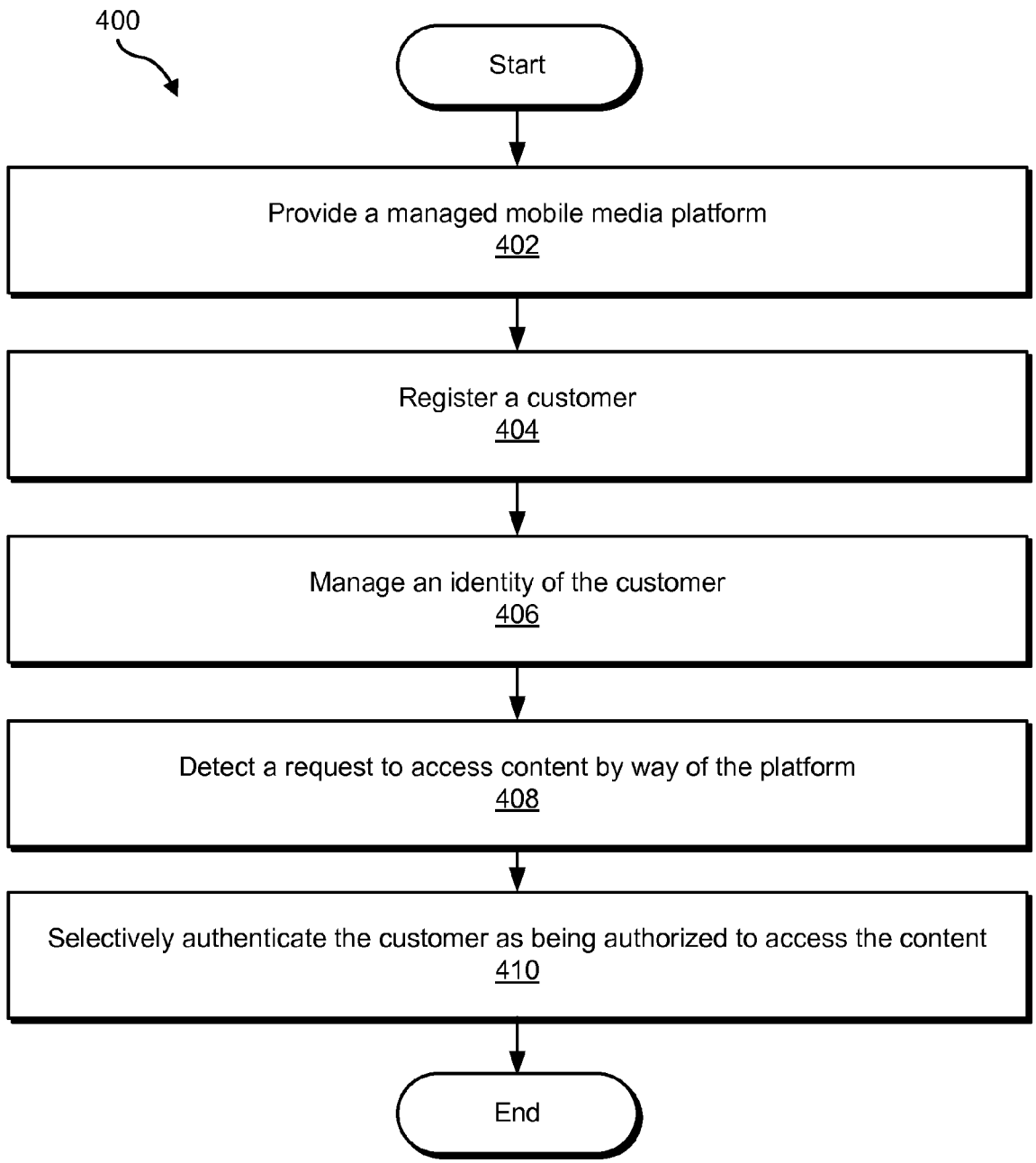
FIG. 4 illustrates an exemplary managed mobile media platform method according to principles described herein.

FIG. 4 illustrates an exemplary managed media platform method 400. While FIG. 4 illustrates exemplary steps according to one embodiment, other embodiments may omit, add to, reorder, combine, and/or modify any of the steps shown in FIG. 4. One or more of the steps shown in FIG. 4 may be performed by platform system 100, implementation 200, vertical system 300, and/or one or more components thereof.

In step 402, platform system 100 provides a managed mobile media platform, such as platform 118, which may be configured as described herein. Step 402 may be performed in any of the ways described herein.

In step 404, platform system 100 registers a customer, who may be a user of a mobile computing device, such as access device 204, which may be configured as described herein. Step 404 may be performed in any of the ways described herein.

In step 406, platform system 100 manages an identity of the customer. Step 406 may be performed in any of the ways described herein.

In step 408, platform system 100 detects a request to access content by way of the platform. The request may be received from the customer (e.g., from the mobile access device utilized by the customer) and may include credentials for the customer and/or additional or alternative information related to the request.

In step 410, platform system 100 selectively authenticates the customer as being authorized to access the content. Platform system 100 may selectively authenticate the customer in response to the request and in any of the ways described herein, including based on credentials included in the request and/or the managed identity of the customer.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 5:
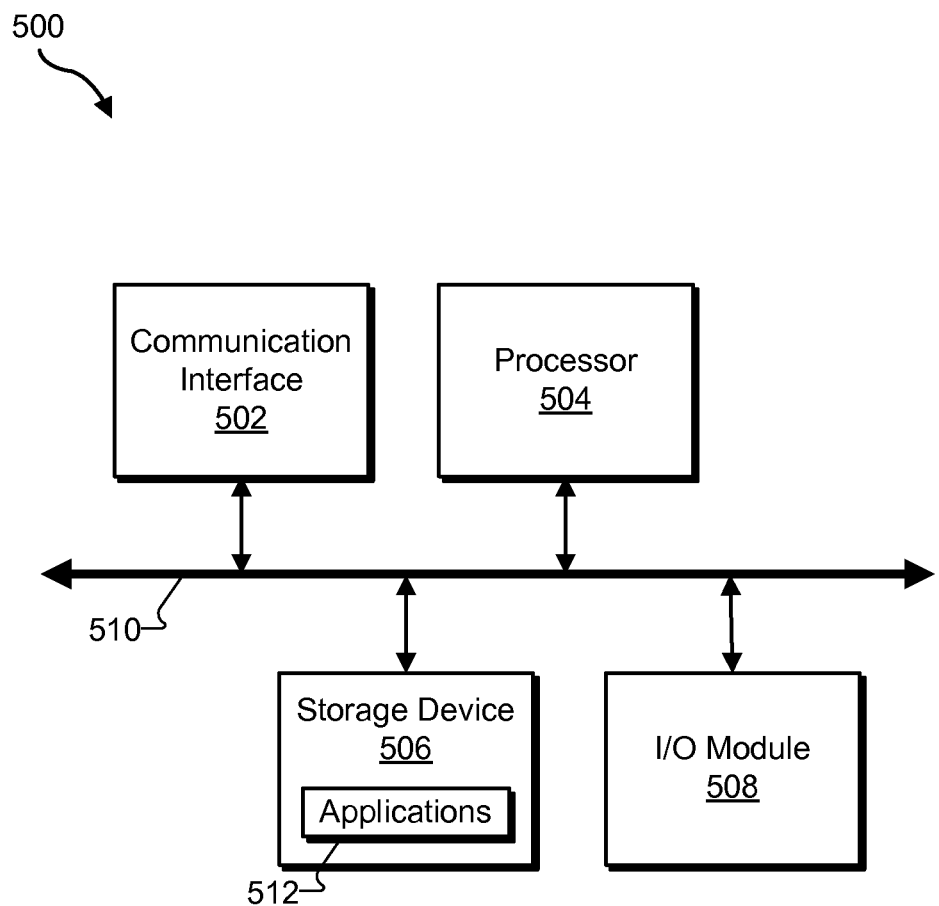
FIG. 5 illustrates an exemplary computing device according to principles described herein.

FIG. 5 illustrates an exemplary computing device 500 that may be configured to perform one or more of the processes described herein. As shown in FIG. 5, computing device 500 may include a communication interface 502, a processor 504, a storage device 506, and an input/output ("I/O") module 508 communicatively connected via a communication infrastructure 510. While an exemplary computing device 500 is shown in FIG. 5, the components illustrated in FIG. 5 are not intended to be limiting. Additional or alternative components may be used in other embodiments. Components of computing device 500 shown in FIG. 5 will now be described in additional detail.

Communication interface 502 may be configured to communicate with one or more computing devices. Examples of communication interface 502 include, without limitation, a wired network interface (such as a network interface card), a wireless network interface (such as a wireless network interface card), a modem, an audio/video connection, and any other suitable interface.

Processor 504 generally represents any type or form of processing unit capable of processing data or interpreting, executing, and/or directing execution of one or more of the instructions, processes, and/or operations described herein. Processor 504 may execute and/or direct execution of operations as directed by one or more applications 512 (which may include one or more software applications 102 included in suite 100) or other computer-executable instructions such as may be stored in storage device 506 or another computer-readable medium.

Storage device 506 may include one or more data storage media, devices, or configurations and may employ any type, form, and combination of data storage media and/or device. For example, storage device 506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 506. For example, data representative of one or more executable applications 512 configured to direct processor 504 to perform any of the operations described herein may be stored within storage device 506. In some examples, data may be arranged in one or more databases residing within storage device 506.

I/O module 508 may be configured to receive user input and provide user output and may include any hardware, firmware, software, or combination thereof supportive of input and output capabilities. For example, I/O module 508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 508 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 500. For example, one or more applications 512 residing within storage device 506 may be configured to direct processor 504 to perform one or more processes or functions associated with mobile device facility 102, managed mobility facility 104, application facility 106, application hosting facility 108, professional services facility 110, service desk facility 112, and/or access management facility 114. Likewise, storage facility 116 may be implemented by or within storage device 506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is a claimed is:

1. A system comprising:
    a mobile computing device provided by a vertical solution provider for use by a customer of an industry service provider to access one or more services provided by the industry service provider; and
    a mobile media platform provider subsystem operated by the vertical solution provider and configured to communicate with the mobile computing device, the mobile media platform provider subsystem implemented in one or more computing devices separate from the mobile computing device;
    wherein
        the mobile media platform provider subsystem and the mobile computing device are configured to provide a mobile media platform managed by the vertical solution provider and configured to facilitate the use of the mobile computing device by the customer to access the one or more services provided by the industry service provider,
        the mobile computing device is locked down by computer-readable code installed on the mobile computing device by the mobile media platform provider subsystem to
            block access, by the mobile computing device, to one or more of code, applications, and features of the mobile computing device, and
            permit access, via a network, to remotely hosted content only from sources controlled by the mobile media platform provider subsystem, the remotely hosted content only from sources controlled by the mobile media platform provider subsystem comprising one or more of an application hosted by the mobile media platform provider subsystem for remote access by the mobile computing device and an application provided by the mobile media platform provider subsystem for installation on the mobile computing device, and
        the mobile media platform provider subsystem is configured to
            manage an identity of the customer of the industry service provider by
                registering the customer with the mobile media platform provider subsystem,
                provisioning credentials for the customer, and
                maintaining an access log that includes information related to one or more access events associated with the customer, the information related to the one or more access events associated with the customer including information related to a historical proximity of the mobile computing device to a mobile phone associated with the customer during the one or more access events, the mobile computing device being separate from the mobile phone associated with the customer, and
            selectively grant the mobile computing device access to the one or more services provided by the industry service provider based at least in part on the credentials for the customer and the information related to the historical proximity of the mobile computing device to the mobile phone associated with the customer during the one or more access events.

2. The system of claim 1, wherein the mobile media platform is managed by the vertical solution provider as a vertical solution in a vertical market.

3. The system of claim 2, wherein the mobile media platform is dedicated for the vertical solution in the vertical market.

4. The system of claim 1, wherein the mobile media platform is managed by the vertical solution provider across a build, a deployment, and an operation of the mobile media platform.

5. The system of claim 1, wherein the mobile media platform provider subsystem is configured to receive a content application from the industry service provider and host the content application for remote access by the mobile computing device.

6. The system of claim 1, wherein the industry service provider comprises a financial service provider.

7. The system of claim 1, wherein the application provided by the mobile media platform provider subsystem for installation on the mobile computing device is accessed by the mobile computing device by way of a private storefront provided by the mobile media platform provider subsystem.

8. The system of claim 1, wherein
the mobile media platform provider subsystem is further configured to bind the identity of the customer to an identity of the mobile computing device; and
the selectively granting the mobile computing device access to the one or more services provided by the industry service provider is further based on the identity of the mobile computing device.

9. The system of claim 1, wherein
the mobile media platform provider subsystem is further configured to determine a geographic location of the mobile computing device, and
the selectively granting the mobile computing device access to the one or more services provided by the industry service provider is further based on the geographic location of the mobile computing device.

10. The system of claim 1, wherein the computer-readable code is installed on the mobile computing device remotely by the mobile media platform provider subsystem.

11. The system of claim 1, wherein the mobile media platform provider subsystem is configured to remotely run the one or more of the code, applications, and features of the mobile computing device blocked from access by the mobile computing device.

12. A system comprising:
a mobile computing device configured by and provided by a vertical solution provider for use by a customer of a financial service provider to obtain mobile access to content provided by the financial service provider for mobile access by the customer by way of a mobile media platform managed by the vertical solution provider; and
a mobile media platform provider subsystem operated by the vertical solution provider and configured to communicate with the mobile computing device and implemented in one or more computing devices separate from the mobile computing device, the mobile media platform provider subsystem comprising an access management facility configured to
manage an identity of the customer by
registering the customer with the mobile media platform provider subsystem, and
provisioning credentials for the customer,
maintain, over time, an access log that includes information related to one or more access events associated with the customer, the information related to the one or more access events associated with the customer including information related to a historical proximity of the mobile computing device to a mobile phone associated with the customer during the one or more access events, the mobile computing device being separate from the mobile phone associated with the customer, and
use at least the credentials for the customer and the information related to the historical proximity of the mobile computing device to the mobile phone associated with the customer during the one or more access events to selectively authenticate the customer as being authorized to access the content provided by the financial service provider,
wherein
the mobile computing device is locked down by computer-readable code installed on the mobile computing device by the mobile media platform provider subsystem to
block access, by the mobile computing device, to one or more of code, applications, and features of the mobile computing device, and
permit access, via a network, to remotely hosted content only from sources controlled by the mobile media platform provider subsystem, the remotely hosted content only from sources controlled by the mobile media platform provider subsystem comprising one or more of an application hosted by the mobile media platform provider subsystem for remote access by the mobile computing device and an application provided by the mobile media platform provider subsystem for installation on the mobile computing device, and
the remotely hosted content only from sources controlled by the mobile media platform provider subsystem includes the content provided by the financial service provider.

13. The system of claim 12, wherein:
the content provided by the financial service provider comprises a financial content application; and
the mobile media platform provider subsystem further comprises an application hosting facility operated by the vertical solution provider and configured to host the financial content application for remote access by the authenticated customer by way of the mobile media platform.

14. The system of claim 13, wherein the mobile media platform provider subsystem further comprises a managed mobility facility configured to facilitate remote management of the mobile computing device by the vertical solution provider.

15. The system of claim 14, wherein the mobile media platform provider subsystem further comprises an application facility configured to facilitate an interactive communication between the customer and the financial service provider by way of the mobile computing device.

16. The system of claim 15, wherein the mobile media platform provider subsystem further comprises a professional services facility configured to provide one or more tools configured for use by a representative of the financial service provider to access one or more professional services provided by the vertical solution provider to facilitate customization of the mobile media platform.

17. The system of claim 16, wherein the mobile media platform provider subsystem further comprises a service desk facility configured to provide one or more tools configured for use by the customer to access technical support provided by the vertical solution provider for the mobile media platform.

18. The system of claim 12, wherein the mobile media platform is managed by the vertical solution provider as a vertical solution in a vertical market.

19. The system of claim 12, wherein the mobile media platform is fully managed end-to-end by the vertical solution provider across a build, a deployment, and an operation of the mobile media platform.

20. A method comprising:
providing, by a managed mobile media platform system, an end-to-end managed mobile media platform to provide a customer of an industry service provider with access, via a mobile computing device provided by a vertical solution provider operating the managed mobile media platform system, to content provided by the industry service provider;
registering, by the managed mobile media platform system, the customer with the managed mobile media platform system, the registering including provisioning credentials for the customer;
managing, by the managed mobile media platform system, an identity of the customer, the managing of the identity of the customer comprising maintaining an access log that includes information related to one or more access events associated with the customer, the information related to the one or more access events associated with the customer including information related to a historical proximity of the mobile computing device to a mobile phone associated with the customer during the one or more access events, the mobile computing device being separate from the mobile phone associated with the customer;
detecting, by the managed mobile media platform system, a request to access, via the mobile computing device, the content by way of the end-to-end managed mobile media platform, the request including the credentials for the customer; and
selectively authenticating, by the managed mobile media platform system based at least in part on the credentials included in the request and the information related to the historical proximity of the mobile computing device to the mobile phone associated with the customer during the one or more access events, the customer as being authorized to access the content,
wherein
the mobile computing device is locked down by computer-readable code installed on the mobile computing device by the managed mobile media platform system to
block access, by the mobile computing device, to one or more of code, applications, and features of the mobile computing device, and
permit access, via a network by way of the mobile computing device, to remotely hosted content only from sources controlled by the mobile media platform provider subsystem, the remotely hosted content only from sources controlled by the mobile media platform provider subsystem comprising one or more of an application hosted by the mobile media platform provider subsystem for remote access by the mobile computing device and an application provided by the mobile media platform provider subsystem for installation on the mobile computing device, and
the remotely hosted content only from sources controlled by the mobile media platform provider subsystem includes the content provided by the industry service provider.

21. The method of claim 20, embodied as computer-executable instructions on at least one non-transitory computer-readable medium.

* * * * *